United States Patent [19]

Houssian

[11] Patent Number: 5,495,402
[45] Date of Patent: Feb. 27, 1996

[54] SAFETY NIGHT LIGHT

[76] Inventor: Vazgen Houssian, 380 Mountain Rd., Union City, N.J. 07087

[21] Appl. No.: 998,542

[22] Filed: Dec. 30, 1992

[51] Int. Cl.⁶ ............................................. H01R 33/00
[52] U.S. Cl. ........................ 362/226; 362/95; 362/186; 362/276; 362/353; 439/135
[58] Field of Search .................... 439/135, 136, 439/296, 299; 362/95, 186, 226, 351, 353, 361, 376, 276, 802

[56] References Cited

U.S. PATENT DOCUMENTS

| | | | |
|---|---|---|---|
| 2,197,946 | 4/1940 | Simpson | 362/226 |
| 2,841,695 | 7/1958 | Bentsen | 362/226 |
| 3,203,126 | 8/1965 | Eliot | 362/226 |
| 3,393,310 | 7/1968 | Ream | 362/276 |
| 3,706,004 | 12/1972 | Schwartz | 362/226 |
| 3,818,212 | 6/1974 | Rochford et al. | 362/226 |
| 4,000,405 | 12/1976 | Horwinski | 362/95 |
| 4,343,032 | 8/1982 | Schwartz | 362/276 |
| 4,816,973 | 3/1989 | Atalla et al. | 362/226 |
| 4,915,638 | 4/1990 | Domian | 439/142 |
| 4,931,911 | 6/1990 | Hanson | 362/95 |

Primary Examiner—James C. Yeung
Assistant Examiner—Alan B. Cariaso
Attorney, Agent, or Firm—Lieberman & Nowak

[57] ABSTRACT

A safety night light has a cover that protects the socket from access in at least the top and lateral directions. The cover contacts the wall to prevent objects from being contacted with the prongs of the night light assembly. Access to the socket is denied, rendering the night light far safer for children than conventional night lights.

20 Claims, 7 Drawing Sheets

SAFETY NIGHT LIGHT

BACKGROUND OF THE INVENTION

The subject patent application is related to U.S. patent application Ser. Nos. 07/880,316 and 07/880,317, both filed May 6, 1992.

Every year children are electrocuted by night lights. Although most injuries are not fatal, a great deal of pain and suffering, both mental and physical, as well as medical expense, could be avoided by the use of the safety night lights described in the subject patent application.

Illustrative of traditional night lights which possess the inherent deficiencies overcome by the subject invention are those described in U.S. Pat. No. 4,714,984, issued Dec. 22, 1989 to Spector, and U.S. Pat. No. 4,878,162, issued Oct. 31, 1989 to Wu. The night lights in these patents are connected to a wall outlet by a pair of prongs which insert into the openings in the outlet. The prongs support the night light and are readily exposed when the night light is even slightly moved. A common cause of injury results when a child contacts the "hot" prong or bridges both prongs with a conductive object such as a kitchen knife.

Various means have been devised to overcome the danger of possible electrocution. U.S. Pat. No. 4,915,638, issued Apr. 10, 1990 to Domian, describes a box-like cover hinged to an outlet cover plate to form a protective enclosure for an electrical outlet. When the box-like cover is formed from a transparent or translucent material, a night light can be inserted therein. In this configuration the night light is protected from the prying hands of children. Likewise, U.S. Pat. No. 4,000,405, issued Dec. 28, 1976 to Horwinski, describes an electrical adaptor/night light. The adaptor/night light is formed to replace the cover plate on an outlet while providing the light and outlet access envisioned by Domian. Although both of these patents provide a safe alternative to the conventional night light, each requires removal of the cover plate, thus necessitating the use of tools and limiting the night light's transportability. Applications for such a device are therefore limited.

Another variation on the conventional night light is described in U.S. Pat. No. 4,723,823, issued Feb. 9, 1988 to Pinkerton, et al. As with the above patents, the socket is completely covered, but a separate outlet cover plate is required.

To overcome the problem of having to remove the cover plate from the outlet, U.S. Pat. No. 4,931,911, issued Jun. 5, 1990 to Hanson, constructed a U-shaped receiving flange for fixedly holding the night light in a predetermined relation to the electrical outlet when the cover plate is attached to the outlet box. As with the above patents, however, the cover plate holding screw must be removed for the night light to be inserted. Additionally, once installed the night light is not readily removable.

Another problem plaguing conventional night lights is the easy access to the bulb while the night light is plugged into the electrical outlet. Electrocution can occur in numerous ways via an accessible bulb. For example, the bulb can break thereby exposing electric elements (not to mention shattered glass). Alternatively, a child can unscrew the light bulb and place his or her finger within the outlet. Such a problem exists with both conventional night lights and the night light described by Hanson.

The subject invention overcomes the prior art limitations by enclosing the bulb within a cover which limits access to both the bulb and the socket. Moreover, the cover is engineered to directly contact the wall at positions adjacent the outlet. To accomplish this, there is provided a recessed area which allows the outlet plate to fit within the cover.

It is an object of the subject invention to provide a safe night light. A further object is to provide a night light which limits access to the bulb and socket. Yet another object is to provide a night light having an aesthetically pleasing cover. Lastly, it is an object is to provide a cover which contacts the wall to minimize the likelihood that a child will contact the prongs of the night light with a conductive object.

SUMMARY OF THE INVENTION

The subject invention provides a safety night light having a night light assembly and a cover. The night light assembly has a plug (including a pair of prongs for coupling with the openings in a wall mounted electrical outlet) and a socket mounted to the plug for holding a light bulb and supplying electricity to the same. The socket has a top, bottom and sides. The cover is coupled to the night light assembly and is configured to enclose at least the top and sides of the socket while contacting the wall adjacent the wall mounted electrical outlet when the night light is plugged into the electrical outlet so that access to the night light assembly is limited. The cover may be translucent, opaque or transparent.

In a preferred embodiment, the cover completely encloses the night light assembly and contacts the wall at all points surrounding the wall mounted electrical outlet when the night light is plugged into the wall mounted electrical outlet. Preferably, the cover is shaped as a hemisphere and further comprises a switch that is accessible through an opening in the cover.

Alternative cover shapes include a partial spheroid, an open or translucent bottom pyramid (such as a triangular pyramid) and a quadrilateral prism. For all embodiments, the safety night light preferably includes a switch.

DETAILED DESCRIPTION OF THE INVENTION

The following description is that of the preferred embodiments of the subject invention. These embodiments are set forth to aid in better understanding the subject invention, but are not to be construed as limiting. With the above in mind, the preferred embodiments will be set forth.

Figure 1:
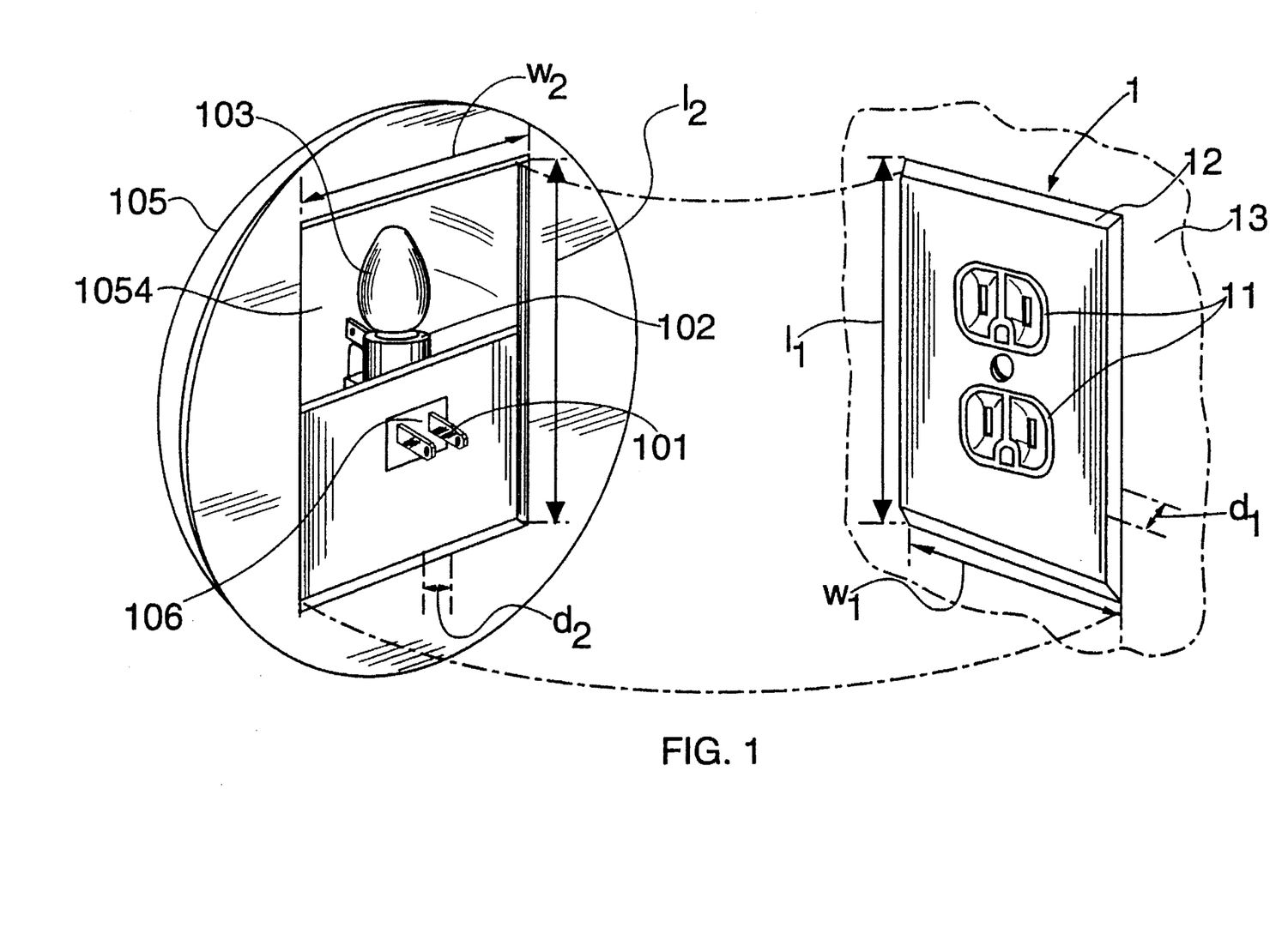
FIG. 1—A perspective view of one embodiment of the safety night light shown in juxtaposition with an electrical outlet.
Figure 2:
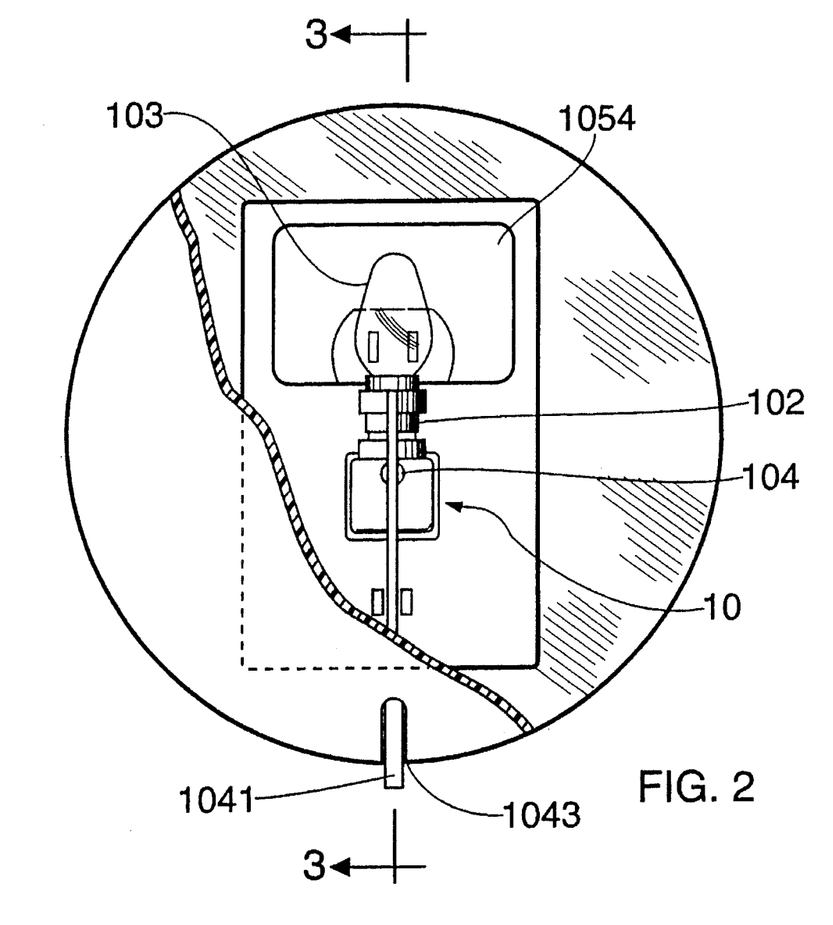
FIG. 2—A front cutaway view of the first embodiment of the subject invention.

The safety night lights of the subject patent application are for use in connection with a conventional electrical outlet 1. A conventional electrical outlet typically has two plug sockets 11 which may be in a two-prong configuration or a three-prong grounded configuration. For the sake of illustration, electrical outlets are shown in the vertical configuration, i.e. one plug socket 11 on top of another. It is to be considered within the scope of the invention to modify the subject night light to be usable when the electrical outlet is in the horizontal configuration, i.e. one plug socket 11 along side of the other. Surrounding plug sockets 11 is an outlet plate 12. Typically outlet plate 12 is of a standard size. However, the size may vary and the subject safety night light can be formed accordingly. Outlet plate 12 generally protrudes above the surrounding wall. The dimensions of outlet plate 12 are labeled in FIG. 1 as $l_1$, $w_1$ and $d_1$, referring to the length, width and depth, respectively.

The subject safety night light is built around a standard night light assembly 10. A night light assembly 10 for the purposes of the subject invention must include a pair of prongs 101 which are insertable into plug socket 11. Typically, prongs 101 are held in alignment by plug 106 which further serves to support socket 102. Prongs 101 serve the dual purpose of supplying an electric current to night light assembly 10 and holding night light assembly 10 in contact with plug socket 11. Night light assembly 10 must also have a socket 102 into which a light bulb or other light emitting device 103 may be inserted. For convenience, light emitting device 103 will be referred to as a light bulb throughout the application. The term "light bulb" should not be viewed as limiting and may include any light generating means. Prongs 101 and socket 102 may be connected by any means known to those skilled in the art, but typical means 10 comprise a simple wire circuit. Preferably, night light assembly be also includes switch 104 for turning light bulb 103 on and off without necessitating removal of night light assembly 10 from plug socket 11. Switch 104 may be of any type known skilled in the art, but will preferably be of the rotatable, pushbutton, pull chain or toggle variety. Alternatively, switch 104 may be a sensor, such as a light (photosensor), motion or other type detector which activates or deactivates (turns on or off) light bulb 103.

Figure 3:
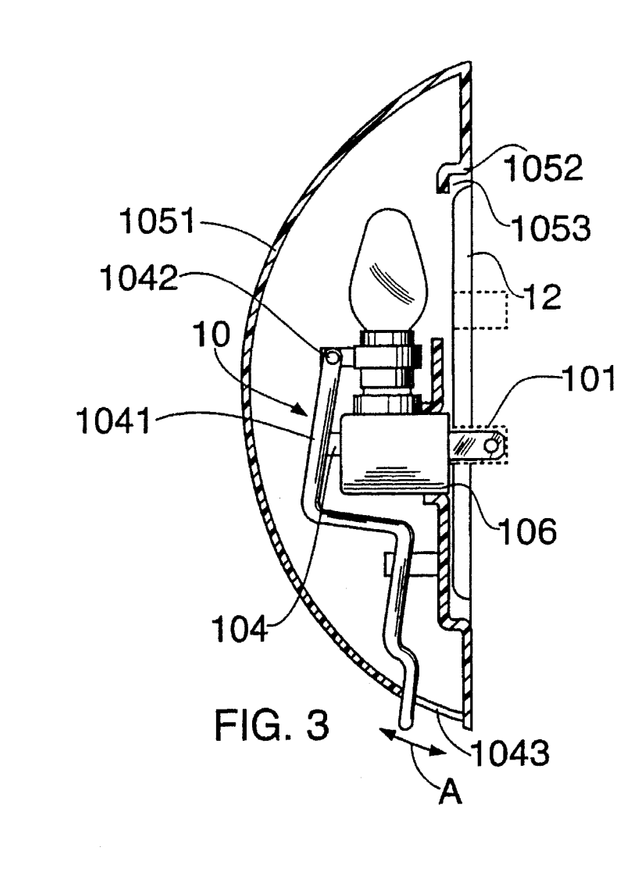
FIG. 3—A cross-sectional view taken along line 3—3 showing the first embodiment of the subject invention.
Figure 4:
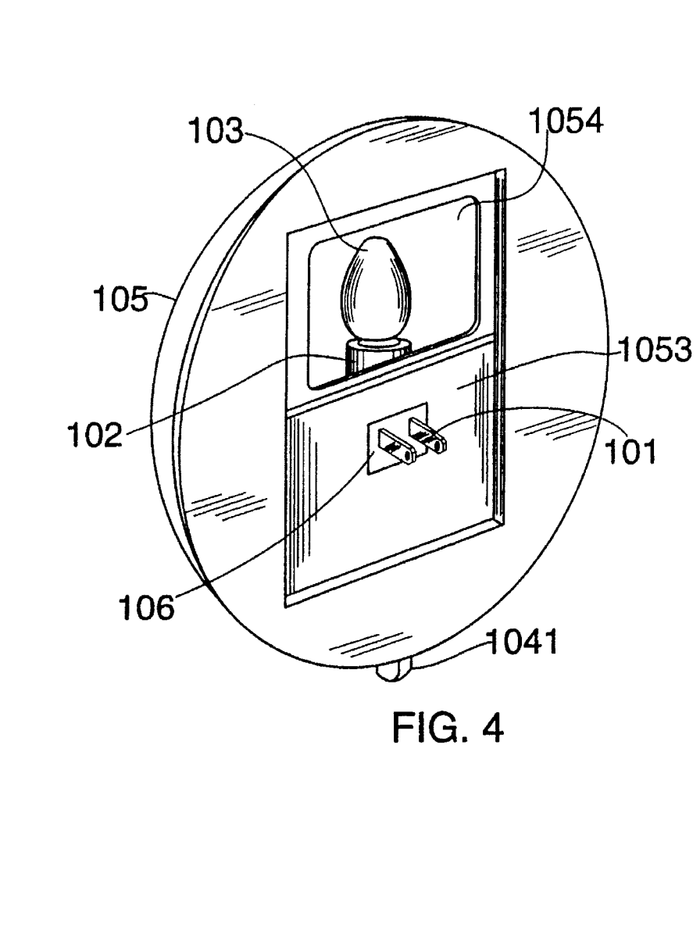
FIG. 4—A rear perspective view showing the first embodiment of the subject invention.
Figure 5:
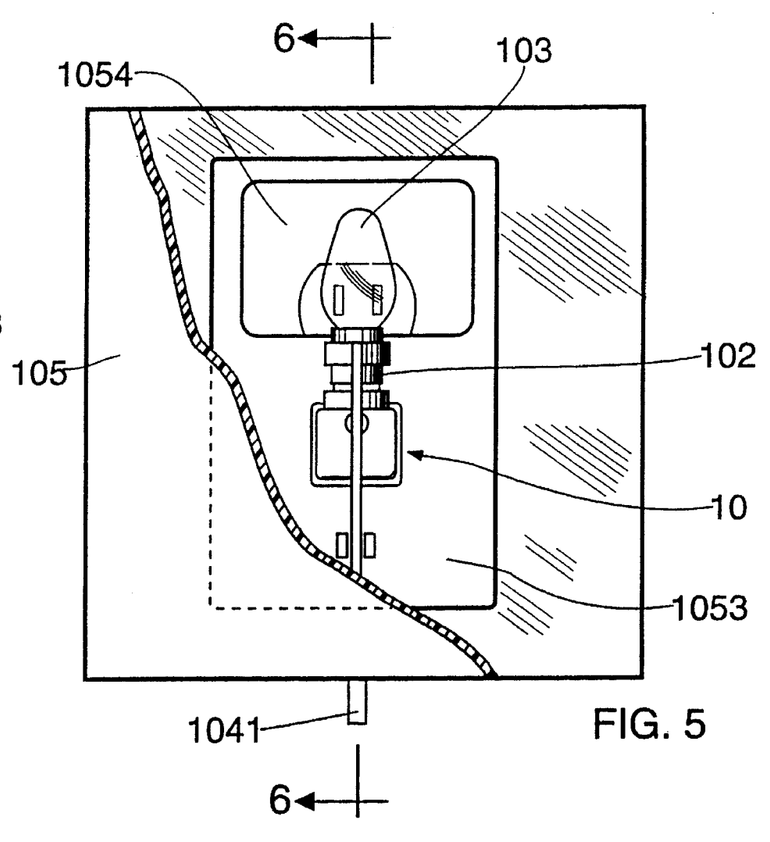
FIG. 5—A front cutaway view showing a second embodiment of the subject invention.
Figure 6:
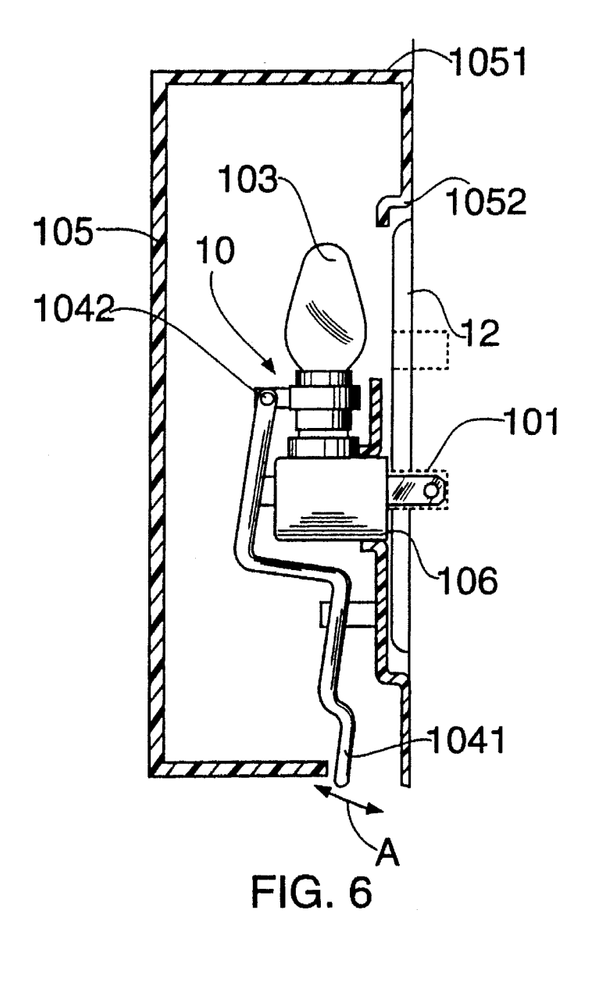
FIG. 6—A cross-sectional view taken along line 6—6 showing the second embodiment of the subject invention.
Figure 7:
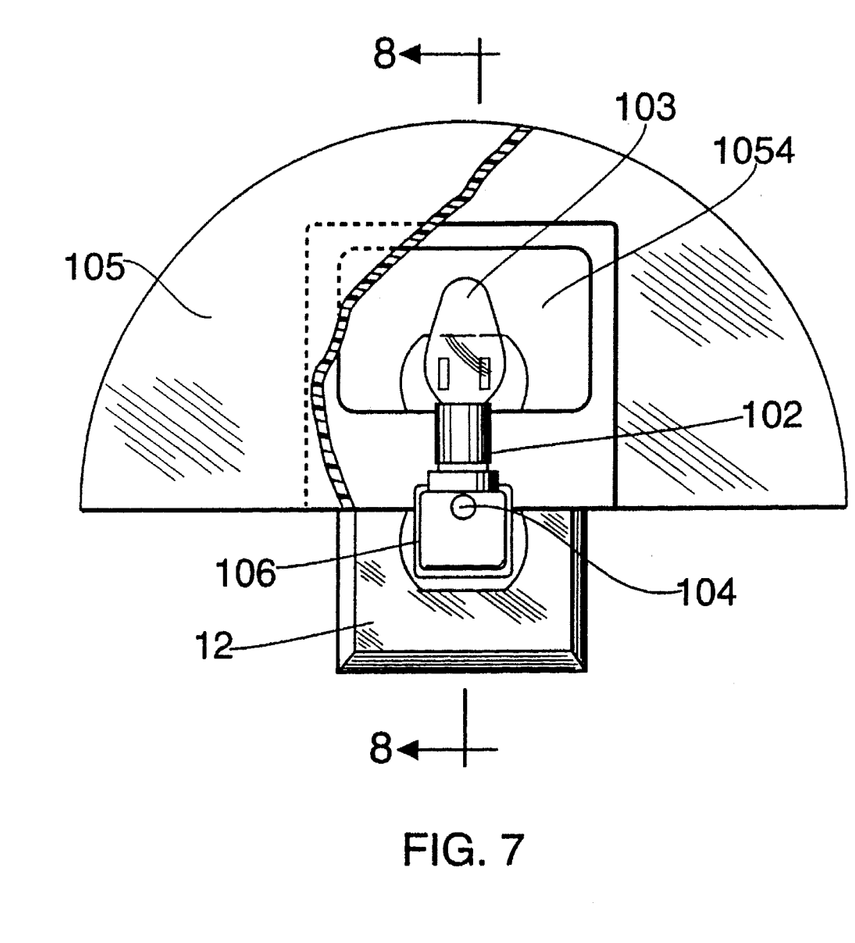
FIG. 7—A front cut-away view showing the third embodiment of the subject invention.

For embodiments in which cover 105 does not completely enclose plug 106, switch 104 may be mounted directly to plug 106. However, for embodiments in which cover 105 completely encloses night light assembly 10, switch 104 must be constructed so that it is accessible through an opening in cover 105. Turning to FIG. 3, switch 104 is depicted as a simple pushbutton type switch. To provide means for pushing the button, lever 1041 is mounted on pivot 1042 and extended through slot 1043 located on cover 105. By moving lever 1041 in the directions depicted by arrow A, switch 104 can be activated from outside cover 105.

Night light assembly 10 is enclosed, at least partially, within cover 105. Cover 105 must enclose the entire socket 102 to limit access via the front, top or sides when night light assembly 10 is inserted into plug socket 11, i.e. night light assembly 10 must be totally enclosed above the level of prongs 101. At a maximum, only the bottom of night light assembly 10 can be accessed from the bottom when the night light is plugged in. In the more preferred embodiments, cover 105 extends completely around night light assembly 10 to prevent any access to night light assembly 10 when night light assembly 10 is engaged with plug socket 11. In the preferred embodiments, cover 105 contacts wall 13 at all points adjacent cover plate 12. The more preferred embodiments are depicted in FIGS. 1–6. Because cover 105 contacts wall 13 adjacent cover plates 12, lifting cover 105 pulls prongs 101 out from plug socket 11. The distance from prong 101 to the edge of cover 105 is normally greater than about 1 inch. This distance is greater than the length of a child's finger tips and causes prongs 101 to be totally withdrawn from plug socket 11 before the child contacts them. For the more preferred hemisphere or spheroid covers, the minimum radius is greater than about 2 inches and is more preferably 3 inches or more.

The main purposes of the subject invention is to provide a safety night light which is aesthetically pleasing to the eye and yet protective of children that come within its vicinity. To accomplish this goal, cover 105 extends to and contacts wall 13 at least above and lateral to socket 102. In the more preferred embodiments depicted in FIGS. 1–6, cover 105 contacts wall 13 at all points radial to night light assembly 10.

As is shown in FIGS. 1–4, the more preferred embodiment comprises a hemisphere which completely enshrouds night light assembly 10 and outlet plate 12. Alternative configurations of cover 105 include geometric shapes formed by sectioning a sphere with a plane, and pyramidal, columnar and prismatic shapes. Cover 105 must be made out of a transparent or translucent material in embodiments which totally enclose night light assembly 10.

Turning to FIGS. 7–12, cover 105 can be made of an opaque material for partially enclosed embodiments thus resulting in a "foot lighting" effect, i.e. light is projected only in a downward direction. Alternatively, the bottom opening may be covered with a transparent material. For all embodiments described, the safety night light has been described as if the outlet is within reach of a child. For the rare situation in which the outlet is above a child's reach, the night light may be used in an upside down manner to provide an up-light effect.

Materials used in the subject invention are readily determinable by those skilled in the art. Since this is not a primer on materials, a listing of all suitable materials will not be set forth. It is generally envisioned, however, that the cover will be formed from a plastic material having a sufficiently high melting point.

Prongs 101 serve to supply electricity to night light assembly 10 and are typically held rigid to one another by plug 106 which acts to support socket 102. Plug 106 generally serves as an anchor onto which prongs 101, socket 102 and cover 105 are secured.

To facilitate manufacture, cover 105 is typically formed from two pieces of injection molded plastic. Referencing FIG. 3, the outer portion of cover 105, hereinafter referred to as 1051, is fused with inner cover 1052 to form cover 105. Inner cover 1052 is typically sealed to the plug 106 using glue, ultrasonic welding or other means known to those skilled in the art.

To permit cover 105 to stay in contact with wall 13, inner cover 1052 must be formed to provide a recess 1053 having depth $d_2$ equal to or slightly greater than depth $d_1$ of outlet plate 12 and length $l_2$ and width $w_2$ at least as large as length $l_1$, and width $w_1$ of outlet plate 12. Depth $d_2$ of recess 105 is the feature having the lowest tolerance for error. If depth $d_2$ is too great, prongs 101 will not properly seat within plug socket 11 and if depth $d_2$ is too little, cover 105 will not stay in contact with or in sufficiently close proximity to wall 13. Accordingly, dimensions $l_2$, $w_2$ and $d_2$ must meet or exceed the dimensions $l_1$, $w_1$ and $d_1$.

Figure 8:
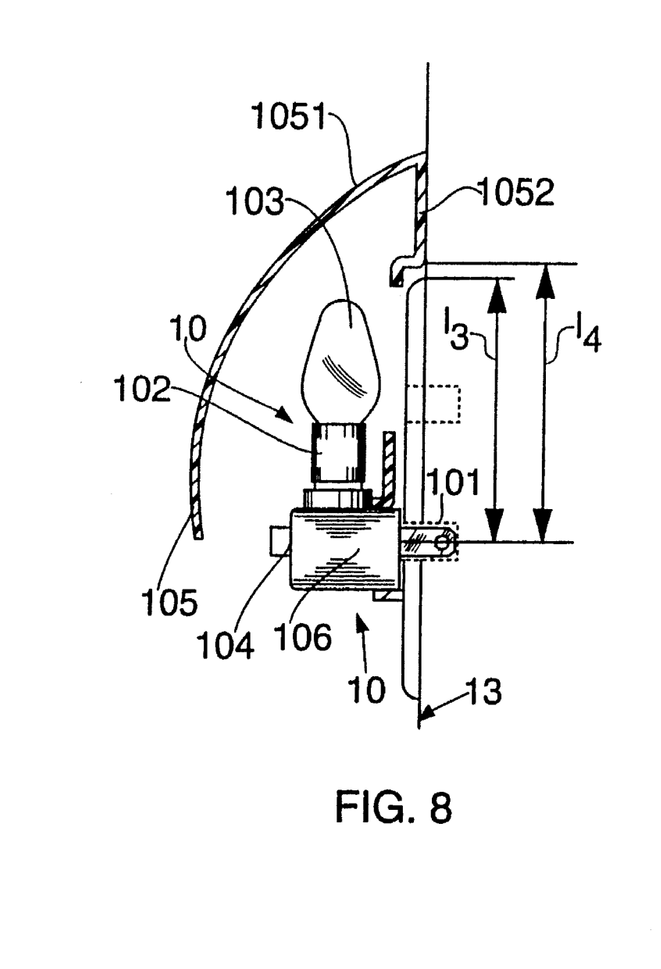
FIG. 8—A cross-sectional view taken along line 8—8 showing the third embodiment of the subject invention.
Figure 9:
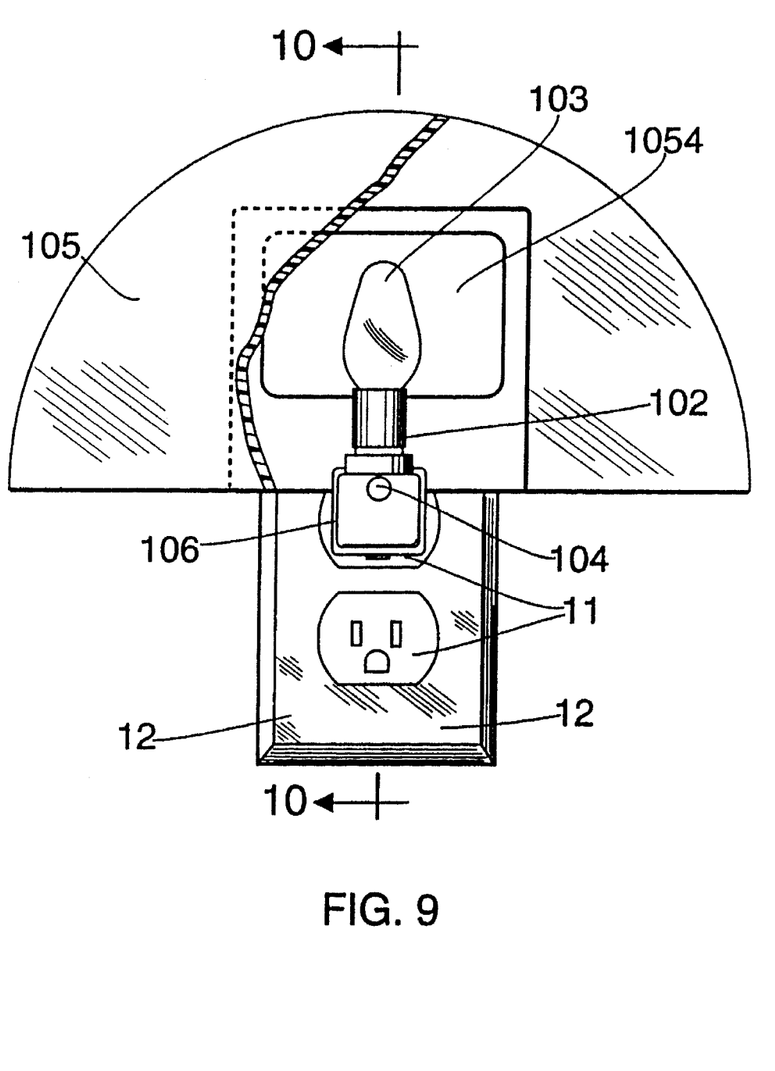
FIG. 9—A front cut-away view showing the fourth embodiment of the subject invention.
Figures 10, 11:
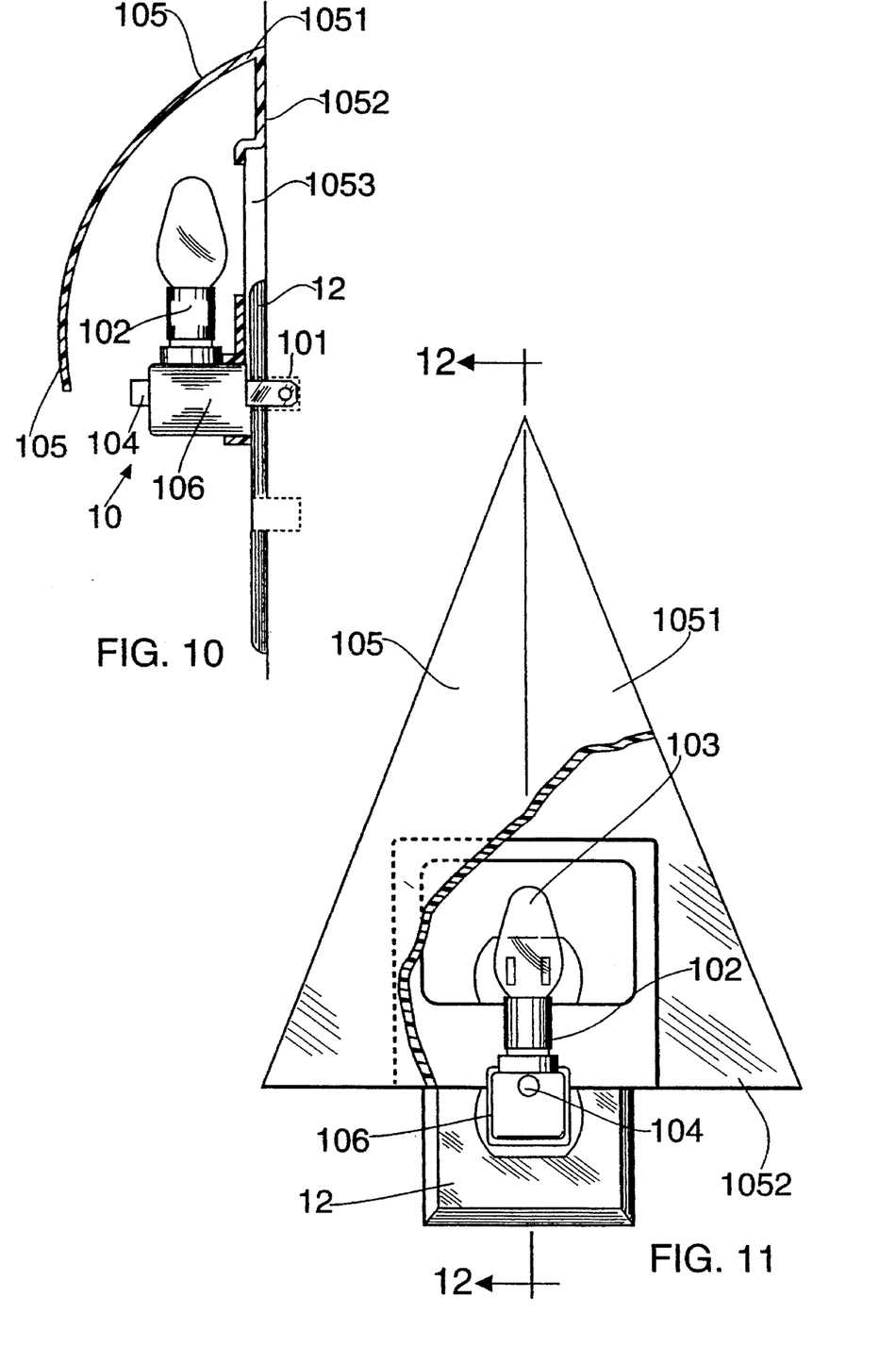
FIG. 10—A cross-sectional view taken along line 10—10 showing the fourth embodiment of the subject invention.
FIG. 11—A front cut-away view showing the fifth embodiment of the subject invention.
Figure 12:
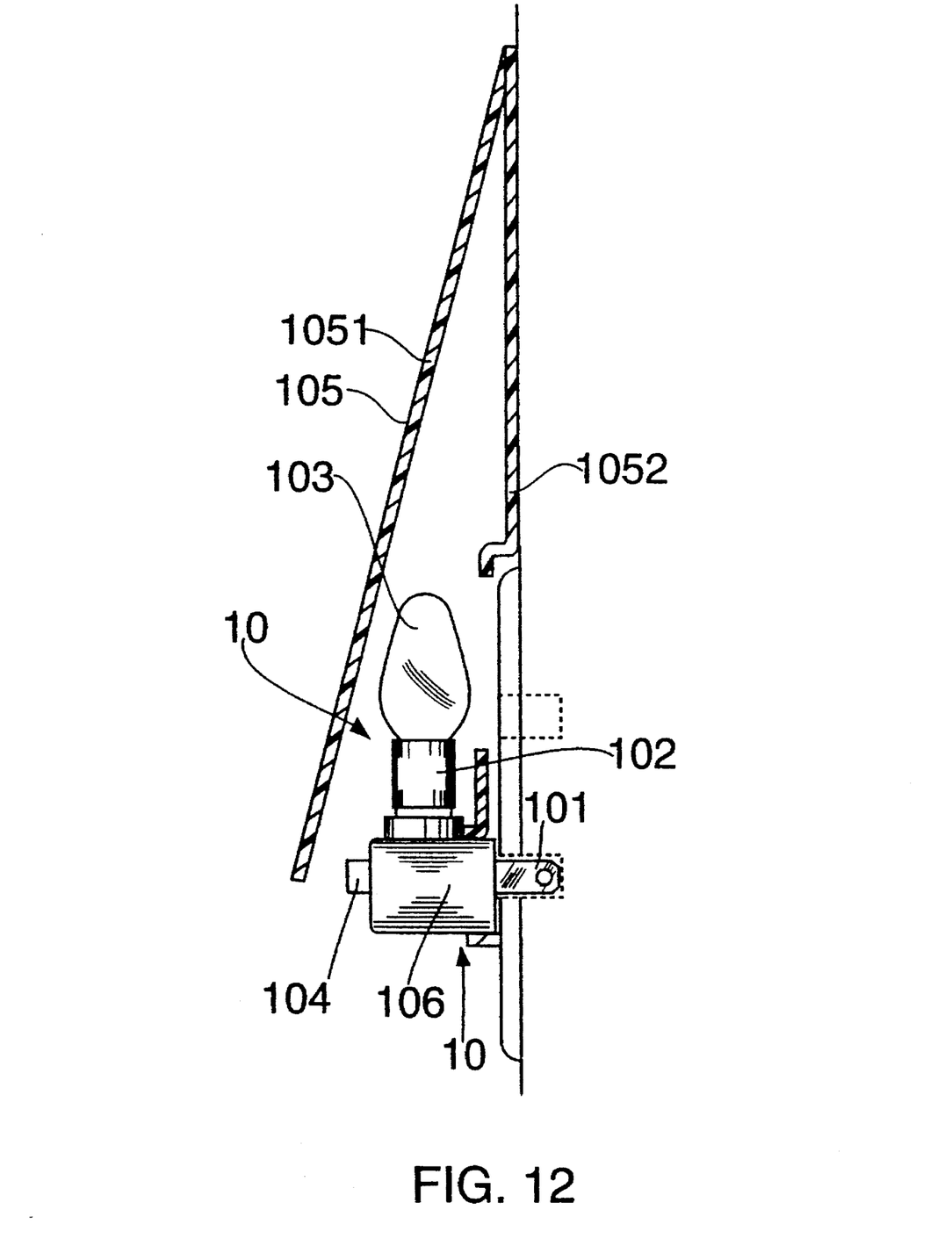
FIG. 12—A cross-sectional view taken along line 12—12 showing the fifth embodiment of the subject invention.

For embodiments in which cover 105 does not completely enclose outlet plate 12, the length of recess 1053 will not exceed the length $l_1$ of outlet plate 12. As shown in FIG. 8, the relevant length measurements are those taken from the bottom of cover 105 to either the top of cover plate 12, hereinafter referred to as $l_3$, and the length taken from the bottom of cover plate 105 to the top of recess 1053, hereinafter referred to as $l_4$. Accordingly, for embodiments such as those shown in FIGS. 7–12 in which cover 105 does not completely enclose outlet plate 12, $l_4$ must always equal or exceed $l_3$. As with the earlier embodiments, $w_2$ and $d_2$ must always meet or exceed $w_1$ and $d_1$.

Inner cover 1052 typically has an opening 1054 which allows access to light bulb 103 when night light assembly 10 is removed from electrical outlet 11. In the preferred embodiments, opening 1054 provides the only means to access light bulb 103. For a child to access light bulb 103, the night light must be completely removed from its source of electricity, thus eliminating danger from electrocution.

The above description of the preferred embodiments is set forth to enable a person skilled in the art to practice the invention. These inventions are not to be construed as limiting. Variations and alternative embodiments are to be considered within the scope and spirit of the subject invention, which is to be limited only by the claims which follow and their equivalents.

What is claimed is:

1. A safety night light which comprises:
   (a) a night light assembly having a plug, the plug including a pair of prongs for coupling with the openings in a wall mounted electrical outlet, and a socket mounted to the plug for holding a light bulb and supplying electricity to the same, the socket having a top, bottom and sides; and
   (b) a cover coupled to the night light assembly, the cover having an outer portion and a back panel and configured to enclose at least the top and sides of the socket while contacting the wall adjacent the wall mounted electrical outlet when the night light is plugged into the electrical outlet so that access to the night light assembly is limited, the back panel having an opening or recess large enough to permit insertion of at least a portion of an outlet plate covering the wall mounted electrical outlet so as to permit said contacting between the cover and the wall.

2. A safety night light of claim 1, wherein the outer portion of the cover is translucent.

3. A safety night light of claim 1, wherein the outer portion of the cover is opaque.

4. A safety night light of claim 1, wherein the outer portion of the cover is transparent.

5. A safety night light of claim 1, wherein the cover completely encloses the night light assembly and contacts the wall to completely enclose the wall mounted electrical outlet when the night light is plugged into the wall mounted electrical outlet.

6. A safety night light of claim 5, wherein the outer portion of the cover is shaped as a hemisphere.

7. A safety night light of claim 6, wherein the hemisphere has a radius greater than about 2 inches.

8. A safety night light of claim 5, wherein the outer portion of the cover is shaped as a partial spheroid.

9. A safety night light of claim 5, wherein the outer portion of the cover is shaped as a pyramid.

10. A safety night light of claim 9, wherein the pyramid is a triangular pyramid.

11. A safety night light of claim 5, wherein the outer portion of the cover is shaped as a quadrilateral prism.

12. A safety night light of claim 1 further comprising a switch.

13. A safety night light of claim 12, wherein the switch is a mechanical switch.

14. A safety night light of claim 12, wherein the switch is a sensor.

15. A safety night light of claim 14, wherein the sensor is a photosensor.

16. A safety night light of claim 5 further comprising a switch which is accessible through an opening in the cover.

17. A safety night light of claim 16, wherein the switch is a mechanical switch.

18. A safety night light of claim 16, wherein the switch is a sensor.

19. A safety night light of claim 18, wherein the sensor is a photosensor.

20. A safety night light of claim 5, wherein minimum distance from one of said prongs to a portion of the outer portion of the cover which contacts the wall is greater than about one inch.

* * * * *